Patented Oct. 12, 1926.

1,603,122

UNITED STATES PATENT OFFICE.

ALBERT KRUEGER, OF GARFIELD, NEW JERSEY.

COMPOSITION FOR LEATHER BELTS.

No Drawing.   Application filed December 3, 1924. Serial No. 753,752.

The present invention relates to a preservative belt dressing, namely a composition to be applied to leather belts to act as a preservative for the belt, and to give the same the desired degree of friction or adhesiveness to the pulley, depending upon the particular kind of machine, width of belt and amount of power applied and other factors, in other words, to prevent belt slipping.

In its preferred composition, I use ten ounces of raw linseed oil as the base of the composition, to which I add say twelve ounces of chlorinated lime (bleaching powder), and say two ounces of calcium carbonate or other similar material. I then mix the mass thoroughly, producing a relatively stiff whitish pasty mass, which is highly adhesive, and to this I preferably add two ounces of eucalyptus oil or a small amount of some other volatile terpene oil, preferably one having a considerable odor in order to overcome the odor of the mixture of chlorinated lime and raw linseed oil.

The chlorinated lime has some kind of a chemical action upon the raw linseed oil, and this chemical action is modified to some extent by the presence of the calcium carbonate. Linseed oil acted upon by chlorniated lme ilonea, that is to say without any further ingredients being added, produces a mixture which is too adhesive, and which does not have a sufficient degree of friction. As an instance of this, I would cite the application of the belt dressing to spinning machines, on which the belts must not pull too hard, otherwise it would cause trouble, and I find that I can decrease the extent of the pull, and modify the siccativeness of the mixture by the use of calcium carbonate, which may be used in the form of precipitated chalk.

In addition to its function in covering up the disagreeable odor of the chlorinated lime and linseed oil, the eucalyptus oil or other similar terpene oil acts to modify the adhesiveness of the belt dressing, or in other words it acts to prevent the belt dressing from losing its adhesiveness during the period through which the volatilization of the eucalyptus oil takes place.

The amount of the belt dressing to be applied to the belt will depend on numerous conditions, and for a belt 20 to 30 feet long, and 3 inches wide, I find that a cylindrical piece of the belt dressing, about as large around as a half dollar and about a half an inch in length, is sufficient.

The proportions can be modified within the scope of the appended claims, without departing from the spirit of the invention.

The dressing is found to act as a preservative for the leather of which the belt is made, so that the belt will last for a much longer period, than when belt dressings containing rosin are used.

It is to be understood that my composition may be used for increasing the efficiency and braking power of automobile brakes, by applying a small amount of the same between the brake drum and the brake band.

I claim:

1. A belt dressing comprising a pasty mass containing 10 parts of raw linseed oil, not substantially less than 10 parts and not substantially more than 15 parts of chlorinated lime, together with smaller amounts of calcium carbonate and a volatile terpene oil.

2. A belt dressing comprising 10 parts linseed oil, about 12 parts of chlorinated lime and smaller amounts of calcium carbonate and a volatile terpene oil.

3. A belt dressing comprising 10 parts of linseed oil, about 12 parts of chlorinated lime and about 2 parts each of calcium carbonate and eucalyptus oil.

4. A belt dressing comprising 10 parts linseed oil, about 12 parts of chlorinated lime and smaller amounts of calcium carbonate and eucalyptus oil.

In testimony whereof I have affixed my signature.

ALBERT KRUEGER.